US010539253B2

(12) United States Patent
Ehrne et al.

(10) Patent No.: US 10,539,253 B2
(45) Date of Patent: Jan. 21, 2020

(54) VACUUM VALVE

(71) Applicant: VAT Holding AG, Haag (CH)

(72) Inventors: Florian Ehrne, Frumsen (CH); Christof Bachmann, Sennwald (CH); Daniel Seitz, Au (CH)

(73) Assignee: VAT Holding AG, Haag (CH)

( * ) Notice: Subject to any disclaimer, the term of this patent is extended or adjusted under 35 U.S.C. 154(b) by 141 days.

(21) Appl. No.: 15/552,822

(22) PCT Filed: Feb. 19, 2016

(86) PCT No.: PCT/EP2016/053527
§ 371 (c)(1),
(2) Date: Aug. 23, 2017

(87) PCT Pub. No.: WO2016/139073
PCT Pub. Date: Sep. 9, 2016

(65) Prior Publication Data
US 2018/0045333 A1    Feb. 15, 2018

(30) Foreign Application Priority Data
Mar. 5, 2015 (AT) .................................. A 114/2015

(51) Int. Cl.
*F16K 51/02* (2006.01)
*F16K 3/02* (2006.01)
(Continued)

(52) U.S. Cl.
CPC .............. *F16K 51/02* (2013.01); *F16K 1/126* (2013.01); *F16K 11/22* (2013.01); *F16K 3/029* (2013.01); *F16K 3/10* (2013.01)

(58) Field of Classification Search
CPC ... F16K 3/02; F16K 3/029; F16K 3/10; F16K 3/16; F16K 3/18; F16K 3/188; F16K 51/02
See application file for complete search history.

(56) References Cited

U.S. PATENT DOCUMENTS

| 4,157,169 A | 6/1979 | Norman |
| 5,083,748 A * | 1/1992 | Batzer .................... F16K 3/188 |
| | | 251/167 |

(Continued)

FOREIGN PATENT DOCUMENTS

| BE | 402908 | 4/1934 |
| CN | 101970918 | 2/2011 |

(Continued)

*Primary Examiner* — Reinaldo Sanchez-Medina
*Assistant Examiner* — Hailey K. Do
(74) *Attorney, Agent, or Firm* — Volpe & Koenig, P.C.

(57) ABSTRACT

A vacuum valve has a valve opening (2, 3) that is surrounded by a valve seat (6, 7), a valve plate (10, 11) that releases the valve opening (2, 3) in an open state and rests against the valve seat (6, 7) in a closed state, and a carrier unit (9) that supports the valve plate (10, 11) and moves between a first position, in which the valve opening (2, 3) is in the open state, and a second position. The valve plate (10, 11) moves between a retracted position and an extended position. In the second position of the carrier unit (9) and in the extended position of the valve plate (10, 11), the valve opening (2, 3) is in the closed state. In the retracted position, the valve plate (10, 11) is supported against the carrier unit (9).

15 Claims, 5 Drawing Sheets

(51) Int. Cl.
*F16K 1/12* (2006.01)
*F16K 11/22* (2006.01)
*F16K 3/10* (2006.01)

(56) References Cited

U.S. PATENT DOCUMENTS

| | | | |
|---|---|---|---|
| 5,087,017 A * | 2/1992 | Sawa | F16K 51/00 |
| | | | 251/175 |
| 6,561,484 B2 | 5/2003 | Nakagawa et al. | |
| 6,899,316 B2 | 5/2005 | Duelli | |
| 7,494,107 B2 * | 2/2009 | Sheydayi | F16K 51/02 |
| | | | 251/175 |
| 7,731,156 B2 * | 6/2010 | Duelli | G05D 16/0613 |
| | | | 251/167 |
| 8,448,918 B2 | 5/2013 | Wagner et al. | |
| 8,905,374 B2 * | 12/2014 | Nygaard | F16K 3/182 |
| | | | 251/195 |
| 9,429,239 B2 | 8/2016 | Jee | |
| 2004/0079915 A1 | 4/2004 | Contin et al. | |
| 2006/0225811 A1 | 10/2006 | Sheydayi et al. | |
| 2007/0290157 A1 * | 12/2007 | Schoen | F16K 3/10 |
| | | | 251/187 |
| 2009/0084997 A1 * | 4/2009 | Lee | F16K 3/06 |
| | | | 251/129.01 |
| 2010/0175771 A1 * | 7/2010 | Garrison | F16K 1/00 |
| | | | 138/91 |
| 2011/0233442 A1 | 9/2011 | Nygaard et al. | |
| 2014/0021395 A1 | 1/2014 | Ehrne | |
| 2014/0021396 A1 | 1/2014 | Ehrne | |
| 2015/0136236 A1 * | 5/2015 | Bachmann | F16K 51/02 |
| | | | 137/12 |

FOREIGN PATENT DOCUMENTS

| | | |
|---|---|---|
| CN | 104204635 | 12/2014 |
| DE | 1900538 | 8/1970 |
| DE | 10114912 | 10/2002 |
| FR | 2207574 | 6/1974 |
| JP | H05196173 | 8/1993 |
| JP | 2000257727 | 9/2000 |
| JP | 2000337553 | 12/2000 |
| KR | 10-20100061214 | 6/2010 |
| WO | 2008038940 | 4/2008 |
| WO | 2011096613 | 8/2011 |

* cited by examiner

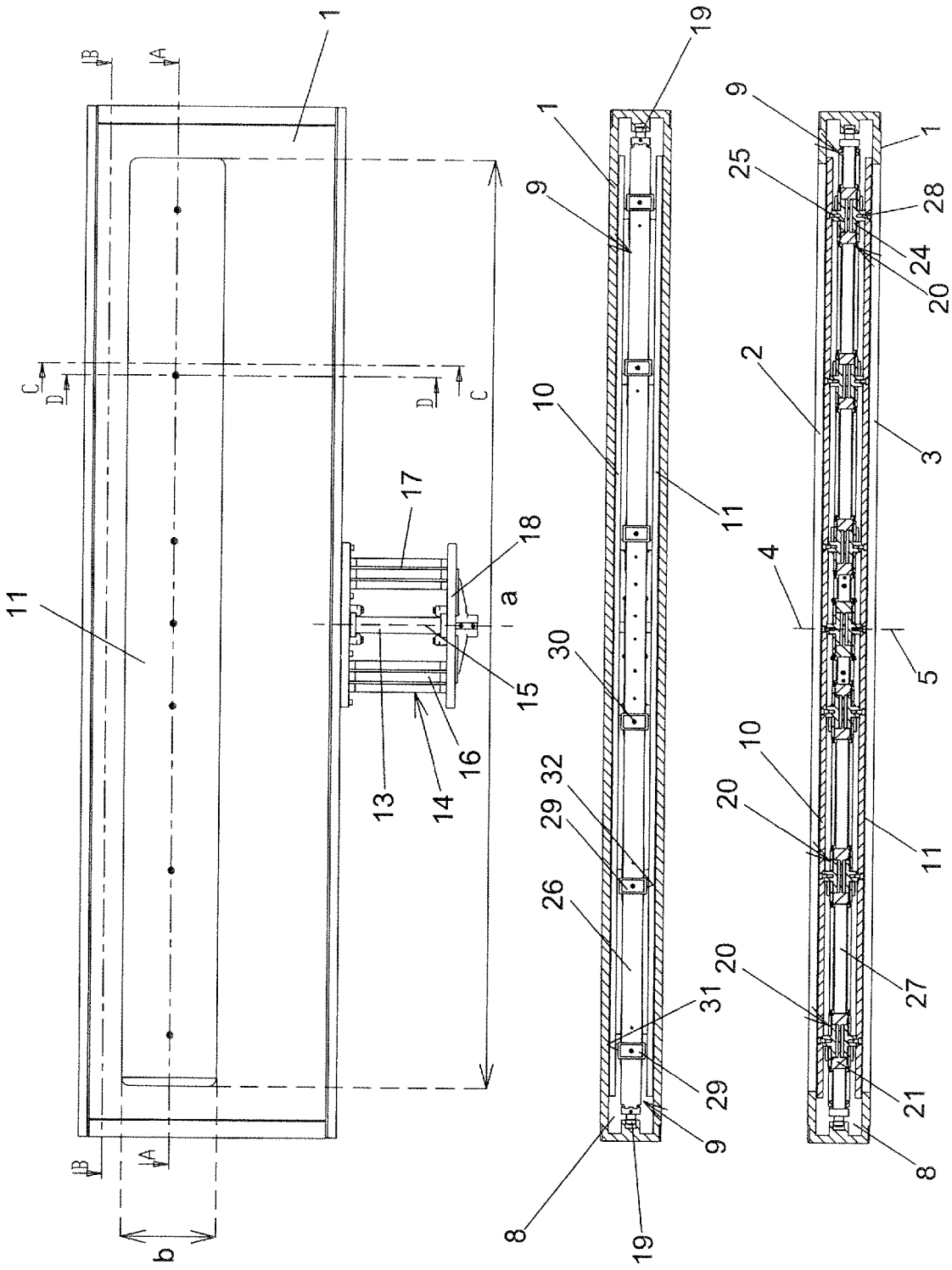

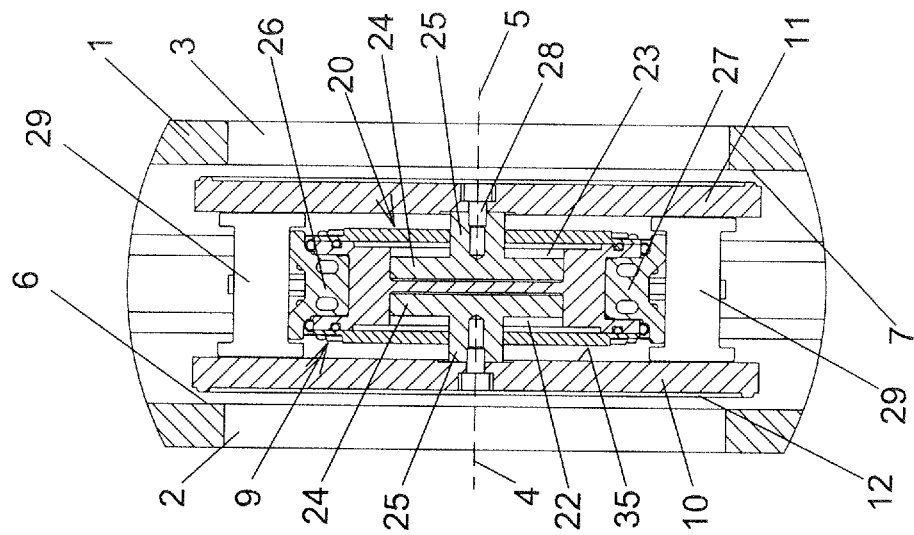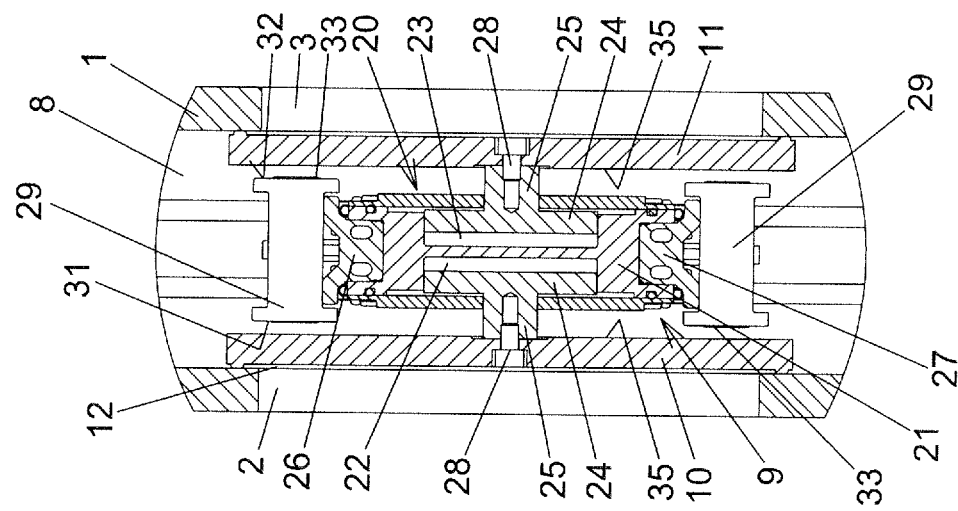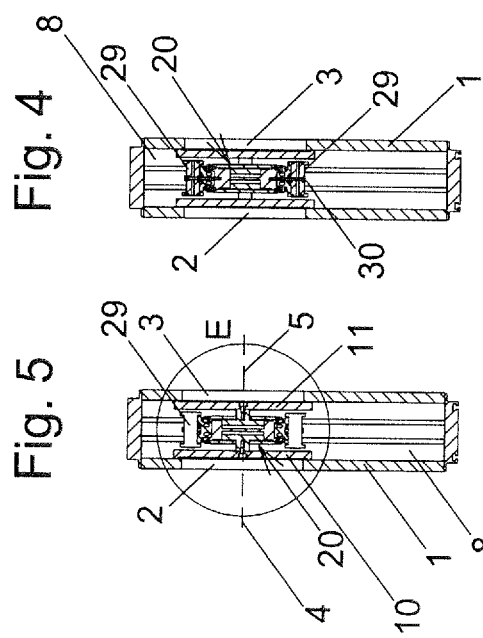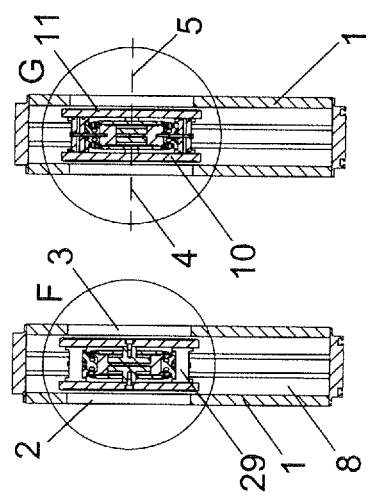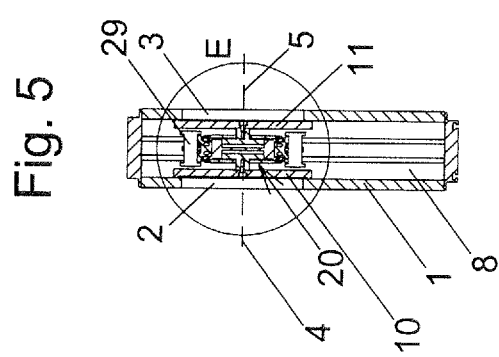

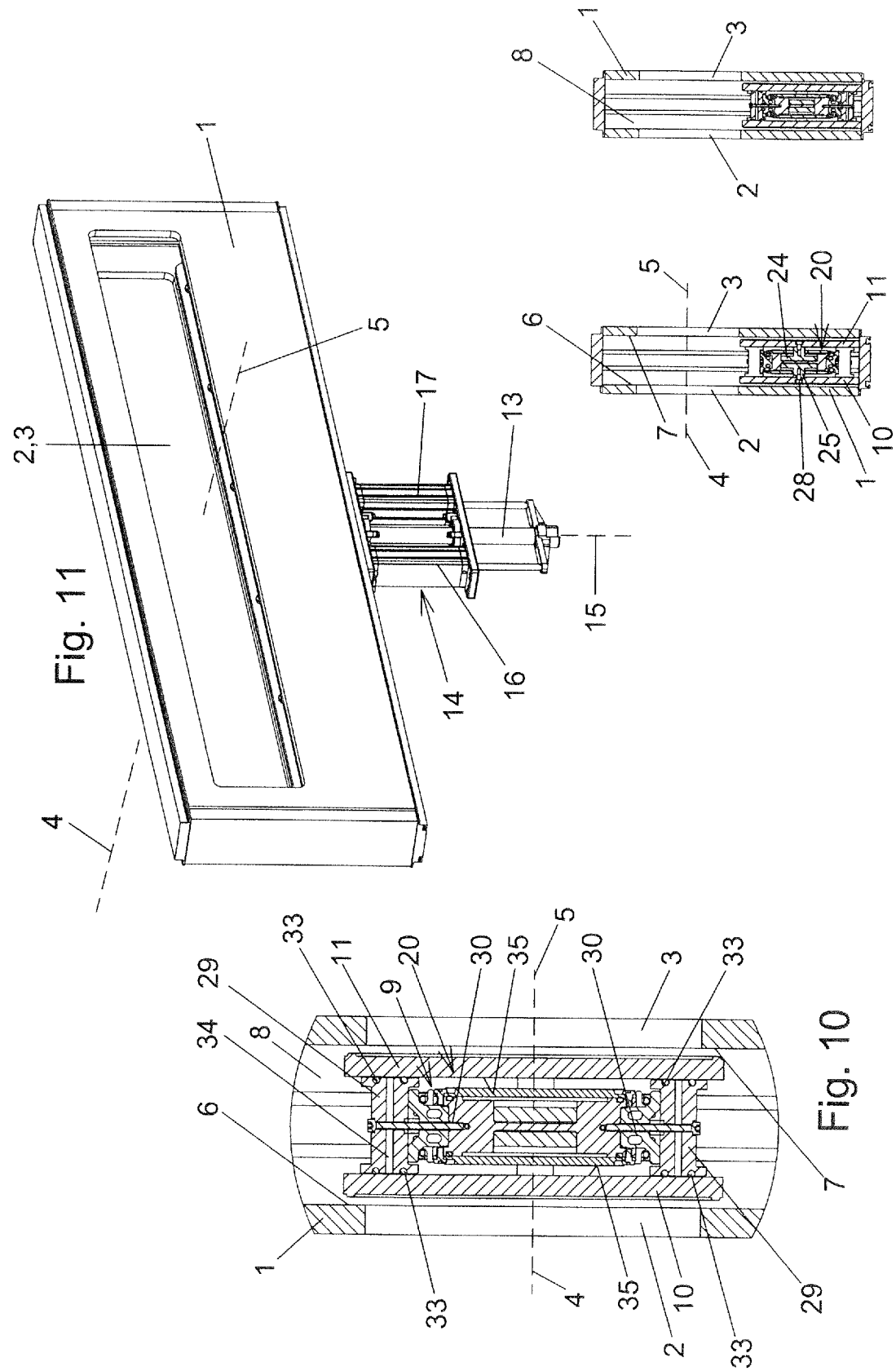

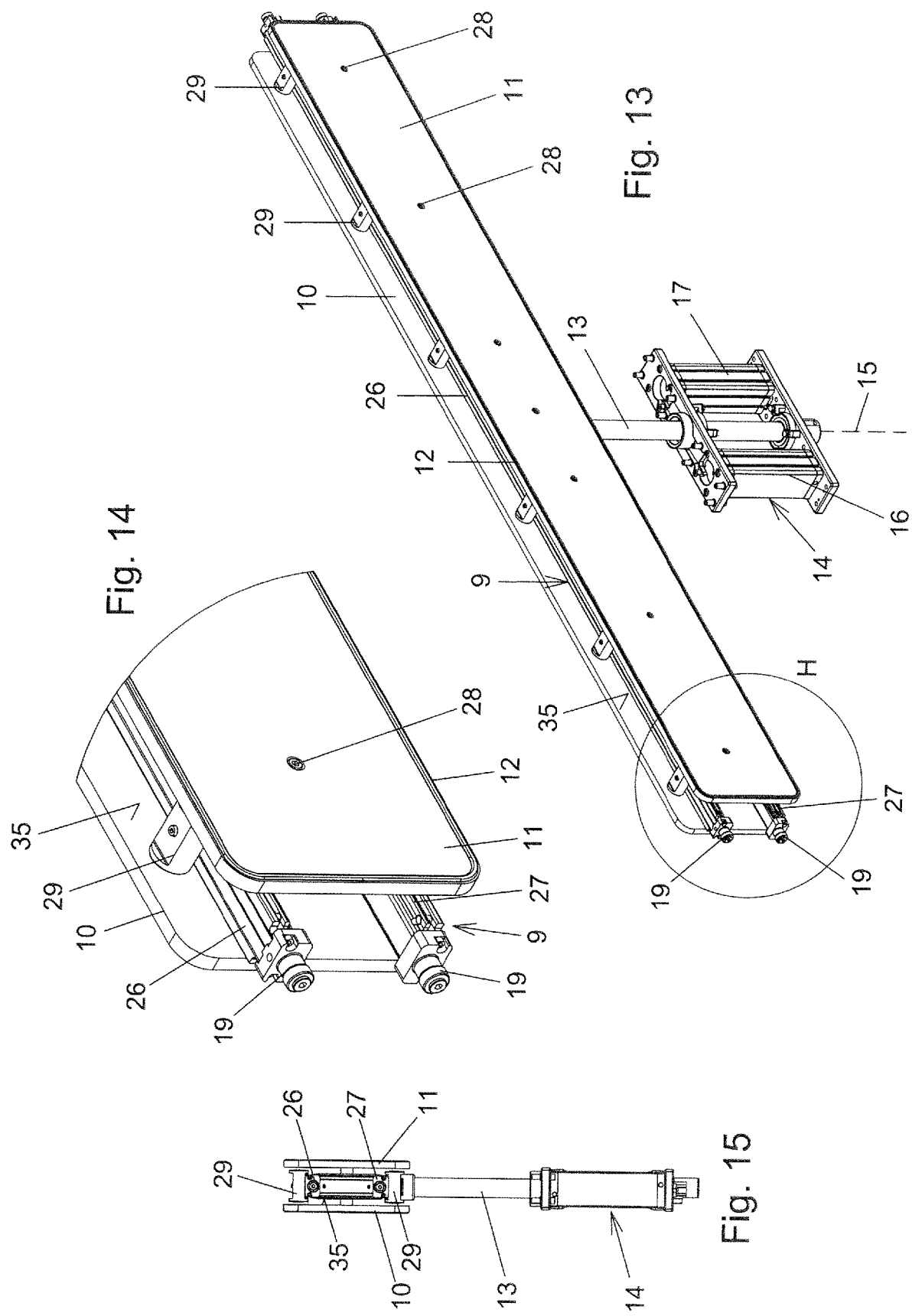

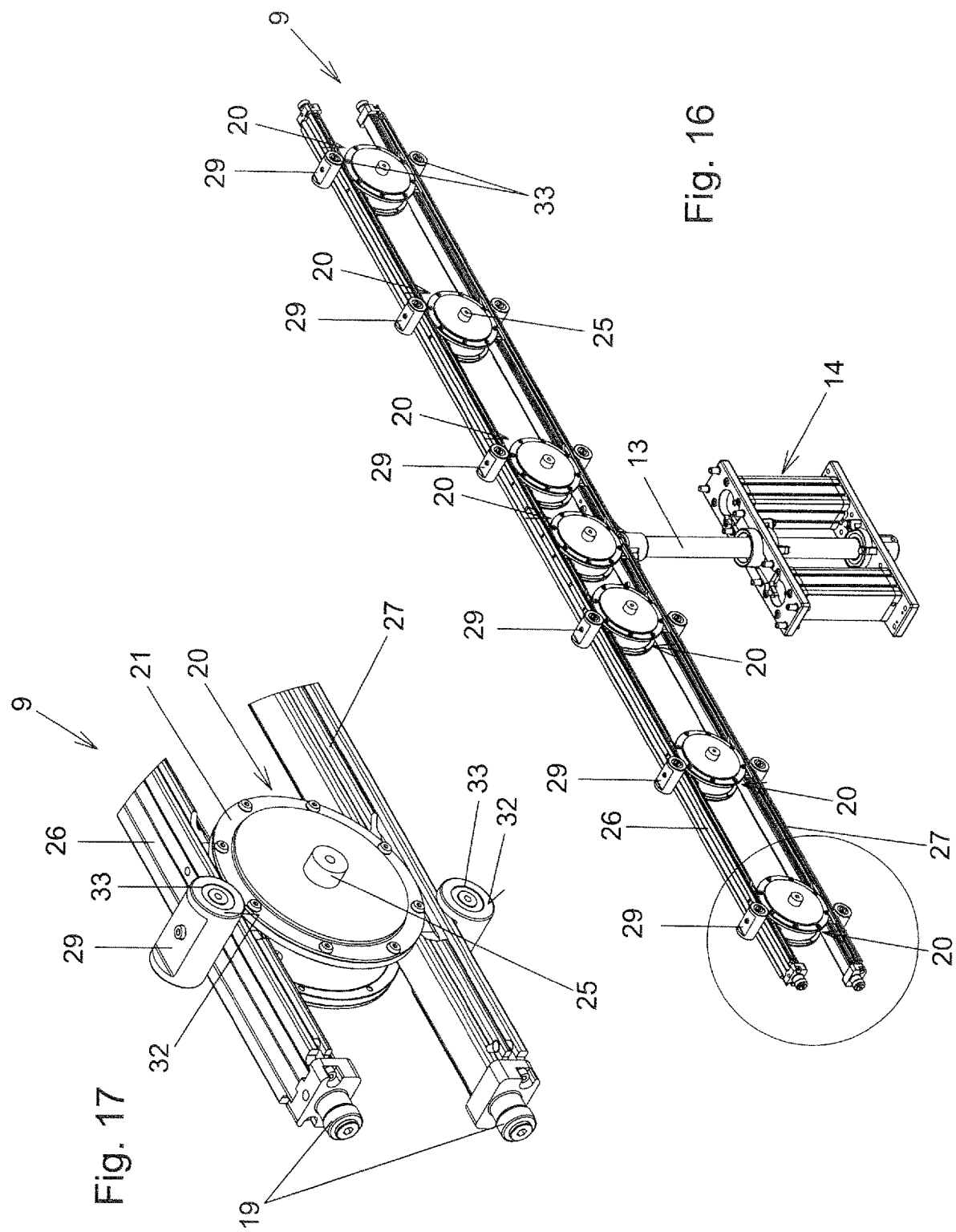

VACUUM VALVE

BACKGROUND

The invention relates to a vacuum valve comprising a valve housing with a valve opening which has an axis and is surrounded by a valve seat, a valve plate which, in an open state of valve opening, releases the valve opening and, in a closed state of the valve opening, bears against the valve seat, and a carrier unit which carries the valve plate and which is adjustable between a first position in which the open state of the valve opening is present and a second position, wherein the valve plate is connected via at least two spaced apart drive elements of the carrier unit to the carrier unit and is adjustable by the drive elements between a retracted position and an advanced position, wherein, in the second position of the carrier unit and the advanced position of the valve plate, the closed state of the valve opening is present.

Such a vacuum valve is apparent from US 2014/0021395 A1. The vacuum valve comprises first and second valve plates which close first and second valve openings in the closed state of the vacuum valve. A carrier unit which carries the valve plates is fitted on a valve rod, by the displacement of which in the direction of its longitudinal axis the carrier unit is adjusted between a first position in which the vacuum valve is open and a second position. The carrier unit has drive elements in the form of piston/cylinder units which are connected to the valve plates and adjust these in the second position of the carrier unit between a retracted position and an advanced position. In the advanced positions of the valve plates, the valve openings are closed by the valve plates. The valve plates are formed so as to be removable from the carrier unit without tools, wherein mushroom-shaped heads of the valve rods can be inserted into receiving slots of receiving parts for connection of the valve plates to the carrier units and at least one of the receiving parts is rotatable in order to fix the valve plate in the pushed-on state.

Further vacuum valves with first and second valve plates borne by a carrier unit, wherein the carrier unit has drive elements for adjustment of the valve plates, are apparent from WO 2011/096613 A1, KR 10-2010-0061214 and US 2006/0225811 A1. A vacuum valve with a single valve plate which is borne by drive elements of a carrier unit is apparent from U.S. Pat. No. 6,899,316 B2. US 2004/0079915 A1 and U.S. Pat. No. 6,561,484 B2 show vacuum valves in which a valve plate and an opposite supporting plate are borne by a carrier unit and are adjustable by drive elements. In the closed state, the supporting plate is supported on the valve housing in order to press the valve plate onto the valve seat.

In the case of valve plates connected to drive elements of a carrier unit, a certain degree of play or a certain degree of mobility of the valve plate is normally permitted. As a result, tolerances can be accepted in order, in the closed state, to achieve uniform pressing of the elastic seal arranged on the valve plate onto the sealing face of the valve seat. Different degrees of expansion of the valve plate and the carrier unit in the case of temperature changes, for example, when heating up the vacuum valve, can also be accepted as a result.

In the case of a removable formation of the valve plates, as is apparent, for example, from US 2014/0021395 A1, degrees of mobility between the valve plate and the carrier unit also occur as a result of play in the connecting devices.

Precisely in the event of the presence of a degree of mobility or play between the carrier unit and the (respective) valve plate and/or in the case of large, heavy valve plates, as are used in vacuum valves with large opening widths, movements occur between the valve plate and the carrier unit during adjustment of the carrier unit between the first and second position as a result of the occurring accelerations. Undesirable particle productions occur in the vacuum as a result of the parts which rub on one another in this case and this can also result in undesirable development of noise. However, even in the case of a screwing of the valve plate with parts of the carrier unit bearing the valve plate, for example, piston rods of drive elements, vibrations of the valve plate occur during adjustment of the carrier unit between the first and second position as a result of the active accelerations, which involves micro-movements between the parts, which are connected to one another, of the valve plate and the carrier unit so that undesirable particles are generated in the vacuum.

SUMMARY

The object of the invention is to provide an advantageous vacuum valve of the above-mentioned type in which a small generation of particles occurs during adjustment of the carrier unit between the first position and the second position. This is achieved by a vacuum valve with one or more features of the invention.

In the case of the vacuum valve according to the invention, at least one valve plate is present which is connected via at least two drive elements, by which the valve plate is adjustable between the retracted position and the advanced position, to the carrier unit and which is supported on the carrier unit in the retracted position via at least one supporting element comprised of plastic. As a result of this support of the valve plate, the valve plate is stabilized in the retracted position. Undesirable noises as a result of movements of the valve plate during the adjustment thereof of the carrier unit between the first position and the second position can be prevented as a result of this and undesirable generation of particles can be significantly reduced.

The at least one supporting element via which the valve plate is supported in its retracted position on the carrier unit is preferably arranged on the carrier unit. In principle, it would also be conceivable and possible to arrange at least one supporting element, via which the valve plate is supported on the carrier unit in its retracted position, on the rear side of the valve plate which faces away from the valve seat.

In one advantageous embodiment of the invention, the carrier unit is fitted on at least one valve rod which is adjustable in a straight line in the direction of the longitudinal axis of the valve rod for adjustment of the carrier unit between the first position and the second position.

In one alternative embodiment, it would in principle be conceivable and possible to fit the carrier unit on a valve rod which is pivotable about an axis lying parallel to the axis of the valve opening.

At least two, particularly preferably three or more supporting elements comprised of plastic are expediently present, preferably on the carrier unit, which supporting elements are spaced apart from one another in the direction of a longitudinal extent of the valve plate which is preferably at a right angle to the longitudinal axis of the at least one valve rod and at a right angle to the axis of the at least one valve opening. At least two supporting elements spaced apart from one another in the direction at a right angle to the longitudinal extent of the valve plate and comprised of plastic can be present in this case.

One advantageous embodiment provides that the supporting elements comprised of plastic are fitted on supporting parts of the carrier unit, which supporting elements are fastened on at least one carrier part of the carrier unit. For example, the carrier unit can have carrier parts formed in a rod-shaped manner, the longitudinal extent of which lies at a right angle to the axis of the at least one valve opening and at a right angle to the longitudinal axis of the at least one valve rod. The drive elements can in this case be formed by piston/cylinder units, the cylinders of which bridge a gap between the carrier parts formed in a rod-shaped manner and in this case connect the carrier parts formed in a rod-shaped manner. Such a framework construction of the carrier unit is already known from the above-mentioned prior art, especially from US 2014/0021395 A1.

In one possible embodiment of the invention, first and second valve plates are arranged on opposite sides of the carrier unit which serve to close first and second valve openings of the valve housing and which are connected in each case to at least two drive elements of the carrier unit. In their retracted positions, both valve plates are supported in each case via at least one supporting element composed of plastic on the carrier unit. The supporting elements can expediently in this case be fitted on supporting faces, pointing in opposite directions, of supporting parts of the carrier unit.

The modulus of elasticity of the at least one supporting element fitted on a supporting part is advantageously smaller than the modulus of elasticity of the supporting part on which the supporting element is fitted.

BRIEF DESCRIPTION OF THE DRAWINGS

Further advantages and details of the invention will be explained below on the basis of the enclosed drawing. In this drawings:

FIG. 1 shows a view of an exemplary embodiment of a vacuum valve according to the invention;

FIG. 2 shows a section along line AA from FIG. 1;

FIG. 3 shows a section along line BB from FIG. 1;

FIG. 4 shows a section along line CC from FIG. 1;

FIG. 5 shows a section along line DD from FIG. 1;

FIG. 6 shows an enlarged detail E from FIG. 5;

FIG. 7 and FIG. 8 show sections analogous to FIGS. 4 and 5, but in the retracted positions of the valve plates;

FIG. 9 shows an enlarged detail F from FIG. 8;

FIG. 10 shows an enlarged detail G from FIG. 7;

FIG. 11 shows an oblique view of the vacuum valve in the open state;

FIGS. 12 and 12A show sections analogous to FIGS. 7 and 8, but in the first position of the carrier unit;

FIG. 13 shows an oblique view of the unit comprising the carrier unit with the valve plates fitted thereon, the valve rod and the valve rod drive;

FIG. 14 shows an enlarged detail H from FIG. 13;

FIG. 15 shows a side view of the unit represented in FIG. 13;

FIG. 16 shows an oblique view analogous to FIG. 13, but without the valve plates; and FIG. 17 shows an enlarged detail I from FIG. 16.

DETAILED DESCRIPTION OF THE PREFERRED EMBODIMENTS

An exemplary embodiment of a vacuum valve according to the invention is represented in the figures. The vacuum valve comprises a valve housing 1 with first and second valve openings 2, 3 which have parallel axes 4, 5. The valve openings 2, 3 are arranged in opposite walls of the valve housing 1 and are flush with one another. The walls having the valve openings 2, 3 possess on their inner sides facing one another valve seats 6, 7 which surround the valve openings 2, 3.

A carrier unit 9 by which a first and a second valve plate 10, 11 are borne is arranged in inner space 8 of the valve housing 1, which inner space 8 forms a vacuum region of the vacuum valve. The valve plates 10, 11 serve to seal off the valve openings 2, 3 in the closed state of the vacuum valve. To this end, the valve plates 10, 11 have elastic sealing rings 12 which, in the closed state of the vacuum valve, are pressed against a sealing face of the respective valve seat 6, 7.

The elastic sealing rings 12 could also be arranged on the valve seats 6, 7 and sealing faces of the valve plates 10, 11 could, in the closed state of the vacuum valve, be pressed onto the sealing rings arranged on the valve seats.

The carrier unit 9 is fitted on a valve rod 13. The valve rod 13 can be displaced in a straight line by a valve rod drive 14 in the direction of its longitudinal axis 15. The valve rod drive 14 is formed here by two piston/cylinder units 16, 17, the cylinders of which are connected to the valve housing 1 and the piston rods of which are connected to a cross member 18 which itself is connected to a portion of the valve rod 13 which lies outside the valve housing 1, preferably to the end of the valve rod 13. The valve rod 13 is guided via a sealed-off linear feedthrough into the inner space 8 of the valve housing 1.

The carrier unit 9 is adjusted between a first position, in which the vacuum valve occupies the open state (cf. FIGS. 11 to 12A), and a second position by a valve rod drive 14 which could also be formed in a different manner, for example, could have only a single piston/cylinder unit. The carrier unit 9 assumes its second position in FIGS. 1 to 10.

Rotatably mounted rollers 19 which run in groove-shaped raceways extending parallel to the valve rod 13 and are formed in opposite walls of the valve housing 1 can be provided, for example, on the carrier unit 9 for guidance of the carrier unit 9 with respect to the valve housing 1.

The valve rod 13 extends at a right angle to the axes 4, 5 of the valve openings 2, 3. Two or more parallel valve rods 13 can also be provided on which the carrier unit 9 is fitted.

The valve plates 10, 11 and the valve openings 2, 3 are, in the exemplary embodiment, formed to be substantially rectangular, and indeed rectangular with rounded edges. An at least substantially rectangular formation of the valve plates 10, 11 and of the valve openings 2, 3 is expedient in different applications for such vacuum valves, in particular if flat, but comparatively wide substrates should be fed through the valve openings 2, 3. Applications for such vacuum valves are, for example, systems for producing photovoltaic modules or flat screens. Further applications are e.g. systems for glass coating or systems for producing solar modules or vacuum ovens.

In the case of such an at least substantially rectangular formation of the valve plates 10, 11, the expansion of the respective valve plate in the direction of the longer rectangular side is referred to as the "longitudinal extent" of the respective valve plate.

A length a of the valve openings 2, 3 measured in the direction at a right angle to the axes 4, 5 of valve openings 2, 3 and at a right angle to the longitudinal axis 15 of the valve rod 13 is preferably at least 2 m. The width b of the valve openings 2, 3 measured in the direction parallel to the longitudinal axis 15 of the valve rod 13 is preferably at least 15 cm.

The carrier unit 9 has several drive elements 20 spaced apart from one another in the direction of the longitudinal extent of the carrier unit 9. The longitudinal extent of the carrier unit 9 is at a right angle to the axes 4, 5 of the valve opening 2, 3 and at a right angle to the longitudinal axis 15 of the valve rod 13.

The drive elements 20 are in each case in the form of piston/cylinder units. The cylinder 21, which is formed in particular with multiple parts, of a respective drive element 20 possesses first and second cylinder chambers 22, 23 in which in each case a piston 24 is received. The piston rods 25 guided out of cylinder chambers 22, 23 proceed from the pistons 24, on which piston rods 25 valve plates 10, 11 are fitted.

The drive elements 20 are represented in a simplified form in the figures. For example, elastically deformable diaphragms running between the respective cylinder 21 and the respective piston rod 25 can be provided in order to seal off the cylinder chambers 22, 23 with respect to the inner space 8 of the valve housing 1. Rod-shaped guide elements projecting into recesses of the pistons 24 can be provided in order to guide the pistons 24 with respect to a respective cylinder 21. The drive elements 20 can, for example, be formed in the manner which is apparent from the above-mentioned prior art, in particular US 2014/0021395 A1.

The valve plates 10, 11 are, in the exemplary embodiment represented in the figures, connected by screws 28 to the piston rods 25. Play can at least partially be present between the screws 28 and the bores in the valve plates 10, 11, through which the screws 28 penetrate, in order to enable different thermal expansions of the valve plates 10, 11 and the carrier unit 9 in the event of temperature changes, for example, when heating up. For example, no play can be provided for such a screw 28 which forms a fixed point, while play is present for the other screws 28.

Instead of screw connections, the connection could also be carried out, for example, via connecting devices which can be opened without tools, for example as known from the above-mentioned prior art, in particular US 2014/0021395 A1.

The carrier unit 9 has, in the exemplary embodiment, first and second rod-shaped carrier parts 26, 27. These lie with their longitudinal extents parallel to one another and at a right angle to the axes 4, 5 of the valve openings and at a right angle to the valve rod 13. The rod-shaped carrier parts 26, 27 spaced apart from one another in the direction of the longitudinal axis 15 of the valve rod 13 are connected to one another by cylinders 21 of the drive elements 20 which bridge the gap between said rod-shaped carrier parts 26, 27.

The valve plates 10, 11 can be displaced linearly between an advanced position (cf. FIGS. 1 to 6) and a retracted position (cf. FIGS. 7 to 10) by the drive elements 20. This linear displacement of the valve plates 10, 11 is preferably carried out parallel to the axes 4, 5 of the valve openings 2, 3.

If the carrier unit 9 assumes its second position and the valve plates 10, 11 assume their advanced position, the closed state of both valve openings 2, 3 is assumed. This can also be referred to as a completely closed state of the vacuum valve and this state is represented in FIGS. 1 to 5.

In order to open the vacuum valve from its completely closed state, both valve plates 10, 11 are firstly adjusted from their advanced position into their retracted position. The carrier unit 9 remains in this case in its second position. This state of the vacuum valve is represented in FIGS. 7 to 10. As a result, the carrier unit is adjusted from its second position into its first position, whereupon the vacuum valve assumes the fully open state, cf. FIGS. 11 to 12A.

If one of both valve plates 10, 11 should be serviced, for example, to replace the sealing ring 12, this can be carried out in the second position of the carrier unit 9 and in the advanced state of the other of the two valve plates 10, 11 (if the drive elements 20 of both valve plates 10, 11 can be activated independently of one another for both valve plates 10, 11). This other one of valve plates 10, 11 can thus as previously in this case seal off the valve opening 2, 3 assigned to it and thus seal off a vacuum chamber which adjoins said valve opening 2, 3. It can, however, also be provided in this case that the other of the valve plates 10, 11 which seals off the valve opening 2, 3 assigned to it likewise has its retracted position, wherein, however, the carrier unit 9 is displaced out of its central position, wherein guidance of the carrier unit 9 with the rollers 19 allows, for this purpose, a sufficient displacement of the carrier unit 9 out of its central location, for example, as a result of the elasticity of the rollers 19. The displacement of the carrier unit from the central location is hereby brought about by a present differential pressure if atmospheric pressure is present in the inner space 8 and a vacuum is present in the vacuum chamber which is sealed off as before.

The inner space 8 of the valve housing 1 can be pumped out or vented via a line which is not represented in the figures.

Compressed air lines for the drive elements 20 can run through channels in the carrier parts 26, 27.

The carrier unit 9 has a plurality of supporting parts 29 which are fastened in the exemplary embodiment by fastening screws 30 on the rod-shaped carrier parts 26, 27. A plurality of the supporting parts 29 spaced apart in the longitudinal direction of the respective carrier part 26, 27 are fitted on each of the rod-shaped carrier parts 26, 27. The supporting parts 29 can be arranged as represented on the side of the respective rod-shaped carrier part 26, 27 facing away from the drive elements 20.

Supporting elements 33 which are comprised of plastic are fitted on lateral faces 31, 32 of the supporting parts 29 pointing in opposite directions, while the supporting parts 29 are preferably comprised of metal. A formation of the supporting parts 29 comprised of plastic, in particular from a plastic which has a larger modulus of elasticity than the supporting elements 33, is conceivable and possible.

The supporting elements 33 retained on the lateral faces 31, 32 of the supporting parts 29 are formed in an annular shape in the represented exemplary embodiment, wherein this is not, however, essential.

For example, the supporting elements 33, as is apparent in particular from FIGS. 4, 7 and 10, can be formed in the form of O-rings which are received in grooves on the lateral faces 31, 32 of the supporting parts 29. For example, the supporting elements 33 could also be vulcanized onto the lateral faces 31, 32.

A bore 34 through which an outer surface of the respective supporting part penetrates up to the screw hole, through which the fastening screw 30 extends, is advantageously provided for aerating the screw hole.

If a respective valve plate 10, 11 is adjusted from the closed state of the vacuum valve, in which the valve plate is located in its advanced position, into its retracted position, i.e. from the position represented in FIGS. 1 to 6 into the position represented in FIGS. 7 to 10, the rear side 35, facing away from the valve seat, of the respective valve plate 10, 11 which is initially spaced apart from the supporting elements 33 runs onto the supporting elements 33. The respective valve plate 10, 11 is thus supported in its retracted position on the carrier unit 9, wherein it bears with its rear side 35 facing away from the valve seat 6, 7 assigned to it against the supporting elements 33 of the carrier unit 9.

In the advanced state of the respective valve plate 10, 11, the supporting elements 33 assigned to it protrude beyond the relevant lateral faces 31, 32 of the supporting parts 29. If the valve plates 10, 11 running onto the supporting elements 33 during retraction compress them sufficiently as a result of the elasticity of the material of the supporting elements 33, bearing of the rear sides 35 of the valve plates 10, 11 on the lateral faces 31, 32 of the supporting parts 29 can also arise in the retracted position of the valve plates 10, 11. The lateral faces 31, 32 of the supporting parts 29 and/or the rear sides of the valve plates 35 could then be provided in the bearing region with a coating comprised of plastic in order to avoid metal/metal contact. However, the rear sides 35 of the valve plates preferably only bear on the supporting elements 33 in their retracted positions and are spaced apart from the lateral faces 31, 32 of the supporting parts 29 by a gap.

The supporting elements 33 comprised of plastic thus damp the running of the respective valve plate 10, 11 onto the carrier unit 9 during adjustment of the respective valve plate 10, 11 into its retracted position. The supporting elements 33 could thus also be referred to as damping elements. To this end, the supporting elements 33 have a sufficiently low modulus of elasticity, preferably of less than 5 kN/mm$^2$, particularly preferably of less than 1 kN/mm$^2$.

In advantageous embodiments, supporting elements 33 are comprised of an elastomer or a thermoplastic elastomer. A formation from a thermoplastic is, for example, also conceivable and possible.

Advantageous materials of which the supporting elements 33 can be comprised are FKM or FFKM. For example, a formation from Teflon, Pa. or also PEEK is also conceivable and possible.

As a result of their support on the carrier unit 9 via the supporting elements 33, the valve plates 10, 11 are stabilized in their retracted positions so that movements, such as vibrations, of the valve plates 10, 11 are at least largely avoided during adjustment of the carrier unit 9 between their first and their second position. As a result of the formation of the supporting elements 33 comprised of a suitable plastic material, running on of the valve plates 10, 11 is carried out in a damped manner during adjustment of the valve plates 10, 11 into their retracted positions.

Different modifications of the shown exemplary embodiment of the invention are conceivable and possible without departing from the scope of the invention, as is apparent from the claims.

The carrier unit 9 could thus be fitted, for example, on several parallel valve rods 13.

In different exemplary embodiments of the invention, the vacuum valve could also have only one single valve plate. Supporting elements could then be arranged only on those lateral faces of supporting parts which face the single valve plate.

The supporting elements 29 could also have different forms, for example, several supporting elements could be present which are aligned parallel to the longitudinal axis 15 of the valve rod 13 and are spaced apart from one another in the direction at a right angle to the longitudinal axis of the valve rod 13 and at a right angle to the axes 4, 5 of the valve openings 2, 3. Tod-shaped supporting parts could also be provided which lie parallel with respect to the carrier parts 26, 27 or the carrier parts 26, 27 could form the supporting parts on which the supporting elements are directly arranged.

The supporting elements could, for example, also be knob-shaped or rod-shaped, particularly in the case of rod-shaped supporting parts.

The carrier unit 9 could also be arranged in a different manner to that represented, for example, also a plate-shaped part on which the drive elements are retained or in which the drive elements are integrated.

It could also be provided that only a single supporting element of the carrier unit is assigned to a respective valve plate 10, 11, which supporting element could then be formed to be, for example, annular, wherein the surface enclosed by this ring is expediently more than 50% of the surface area of the rear side of the respective valve plate 10, 11.

The supporting elements or a single annular supporting element could also be arranged on the rear side of the respective valve plate. For example, a supporting element, the shape and size and material of which corresponds to the sealing ring arranged on the rear side of the valve plate, could also be arranged on the rear side of a respective valve plate.

A part of the drive elements 20 represented in the figures could also be formed as pure guide elements without a drive function, for example, the central drive element could be omitted and such a guide element could be used instead. Such a guide element serves to guide the respective valve plate 10, 11 between the retracted and the advanced position and for transmission of at least a part of the weight loading of the valve plate 10, 11 to the carrier unit. The drive elements 20 are relieved of load as a result or the drive elements could be provided on which the weight loading of the respective valve plate 10, 11 does not act. Such guide elements could also be present in addition to represented drive elements 20. Such guide elements are known, for example, from the above-mentioned prior art, in particular in accordance with US 2014/0021395 A1.

KEY TO THE REFERENCE NUMBERS

1 Valve housing
2 Valve opening
3 Valve opening
4 Axis
5 Axis
6 Valve seat
7 Valve seat
8 Inner space
9 Carrier unit
10 Valve plate
11 Valve plate
12 Sealing ring
13 Valve rod
14 Valve rod drive
15 Longitudinal axis
16 Piston/cylinder unit
17 Piston/cylinder unit
18 Cross member
19 Roller
20 Drive element
21 Cylinder
22 First cylinder chamber
23 Second cylinder chamber
24 Piston
25 Piston rod
26 Carrier part 27 Carrier part
28 Screw
29 Supporting part
30 Fastening screw
31 Lateral face
32 Lateral face
33 Supporting element
34 Bore
35 Rear side

The invention claimed is:

1. A vacuum valve comprising a valve housing with a valve opening which has an axis and is surrounded by a valve seat, a valve plate which, in an open state of the valve opening, releases the valve opening and, in a closed state of the valve opening, bears against the valve seat, and a carrier unit which is adjustable between a first position in which the open state of the valve opening is present and a second position, the carrier unit comprising at least two spaced apart drive elements that are attached to the carrier unit and carry the valve plate, the valve plate is adjustable by the at least two drive elements between a retracted position and an advanced position, wherein, in the second position of the carrier unit and the advanced position of the valve plate, the closed state of the valve opening is present, the carrier unit further comprising at least one supporting element comprised of plastic that is attached to the carrier unit separately from the at least two drive elements, wherein, in the advanced position of the valve plate, a rear side of the valve plate, facing away from the valve seat, is spaced apart from the at least one supporting element and, in the retracted position of the valve plate, the rear side of the valve plate bears on the at least one supporting element and the valve plate is thus supported by the at least one supporting element on the carrier unit,
wherein the carrier unit comprises first and second carrier parts each having a rod-shaped form to which cylinders of the drive elements are rigidly connected, and the cylinders of the at least two drive elements bridge a gap between the first and second carrier parts.

2. The vacuum valve as claimed in claim 1, wherein the at least one supporting element is arranged on the carrier unit.

3. The vacuum valve as claimed in claim 1, wherein the at least one supporting element is at least two supporting elements spaced apart from one another in a direction of a longitudinal extent of the valve plate and comprised of plastic.

4. The vacuum valve as claimed in claim 1, wherein the at least one supporting element is at least two supporting elements spaced apart from one another in a direction at a right angle to a longitudinal extent of the valve plate and comprised of plastic.

5. The vacuum valve as claimed in claim 1, wherein, in order to support the valve plate in the retracted position of the valve plate, the at least one supporting element is two or more supporting elements comprised of plastic which are arranged on supporting parts of the carrier unit, the supporting parts are each fastened to at least one carrier part of the carrier unit.

6. The vacuum valve as claimed in claim 1, wherein each of the at least two drive elements comprises a cylinder having at least one cylinder chamber and at least one piston, which is arranged in the cylinder chamber, with a piston rod, and the piston rod of the at least one piston is connected to the valve plate.

7. The vacuum valve as claimed in claim 1, wherein the carrier unit is fitted on at least one valve rod which is adjustable in a direction of a longitudinal axis of the at least one valve rod for adjustment of the carrier unit between the first position and the second position.

8. The vacuum valve as claimed in claim 1, wherein the at least one supporting element is fitted on a respective supporting part of the carrier unit and has a smaller modulus of elasticity than the respective supporting part.

9. The vacuum valve as claimed in claim 1, wherein supporting parts are arranged on the first and second carrier parts at sides of the first and second carrier parts facing away from the at least two drive elements and the at least two supporting elements are arranged on the supporting parts.

10. The vacuum valve as claimed in claim 1, further comprising the valve opening in the valve housing is a first valve opening and the valve housing further comprises a second valve opening having a second valve axis, and the axes of the first and second valve openings are parallel, the second valve opening is surrounded by a second valve seat, and the valve plate is a first valve plate, the vacuum valve further comprising a second valve plate, and the first and second valve plates are borne by the carrier unit, said first and second valve plates are arranged on opposite sides of the carrier unit and, respectively in an open state of the respective first and second valve openings assigned to the respective first and second valve plates, release the respective first and second valve openings assigned to the respective first and second valve plates and, in a closed state of the respective first and second valve openings assigned to the respective first and second valve plates, bear against the respective first and second valve seats of the respective first and second valve openings assigned to the respective first and second valve plates, wherein both the first and the second valve plates are connected via at least two spaced apart ones of the at least two drive elements of the carrier unit to the carrier unit and are adjustable by said drive elements between respective retracted positions and respective advanced positions, wherein in the second position of the carrier unit and in the advanced position of the respective first and second valve plates, the closed state of the respective first and second valve openings assigned to the respective first and second valve plates is present, wherein both the first valve plate and the second valve plate in said retracted positions are supported via the at least one supporting element comprised of plastic on the carrier unit.

11. The vacuum valve as claimed in claim 10, wherein each of said at least one supporting element comprised of plastic is arranged on lateral surfaces pointing in opposite directions by supporting parts of the carrier unit.

12. The vacuum valve as claimed in claim 10, wherein each of the at least two drive elements comprises a cylinder having at least one cylinder chamber and at least one piston, which is arranged in the cylinder chamber, with a piston rod, and the piston rods of the pistons are connected to at least one of the valve plates.

13. The vacuum valve as claimed in claim 10, wherein the carrier unit is fitted on at least one valve rod which is adjustable in a direction of a longitudinal axis of the at least one valve rod for adjustment of the carrier unit between the first position and the second position.

14. The vacuum valve as claimed in claim 10, wherein the the at least one supporting element has a smaller modulus of elasticity than a supporting part of the carrier unit on which it is fitted.

15. A vacuum valve comprising a valve housing with a valve opening which has an axis and is surrounded by a valve seat, a valve plate which, in an open state of the valve opening, releases the valve opening and, in a closed state of the valve opening, bears against the valve seat, and a carrier unit which is adjustable between a first position in which the open state of the valve opening is present and a second position, the carrier unit comprising at least two spaced apart drive elements that are attached to the carrier unit and carry the valve plate, the valve plate is adjustable by the at least two drive elements between a retracted position and an advanced position, wherein, in the second position of the carrier unit and the advanced position of the valve plate, the closed state of the valve opening is present, the carrier unit further comprising at least one supporting element comprised of plastic that is attached to the carrier unit separately from the at least two drive elements, wherein, in the advanced position of the valve plate, a rear side of the valve plate, facing away from the valve seat, is spaced apart from the at least one supporting element and, in the retracted position of the valve plate, the rear side of the valve plate bears on the at least one supporting element and the valve plate is thus supported by the at least one supporting element on the carrier unit, wherein the at least one supporting element is fitted on a respective supporting part of the carrier unit and has a smaller modulus of elasticity than the respective supporting part.

* * * * *